(12) United States Patent  
Fujioka

(10) Patent No.: US 10,358,001 B2  
(45) Date of Patent: Jul. 23, 2019

(54) PNEUMATIC TIRE

(71) Applicant: TOYO TIRE & RUBBER CO., LTD., Osaka-shi, Osaka (JP)

(72) Inventor: Tsuyoshi Fujioka, Osaka (JP)

(73) Assignee: TOYO TIRE CORPORATION, Osaka-shi (JP)

( * ) Notice: Subject to any disclaimer, the term of this patent is extended or adjusted under 35 U.S.C. 154(b) by 141 days.

(21) Appl. No.: 15/161,416

(22) Filed: May 23, 2016

(65) Prior Publication Data

US 2016/0368327 A1  Dec. 22, 2016

(30) Foreign Application Priority Data

Jun. 19, 2015 (JP) ................................. 2015-124065

(51) Int. Cl.
| | | |
|---|---|---|
| *B60C 11/12* | (2006.01) | |
| *B60C 11/04* | (2006.01) | |
| *B60C 11/03* | (2006.01) | |

(52) U.S. Cl.
CPC ............ *B60C 11/125* (2013.01); *B60C 11/04* (2013.01); *B60C 11/042* (2013.01); *B60C 11/047* (2013.01); *B60C 2011/0346* (2013.01); *B60C 2011/0348* (2013.01); *B60C 2011/0355* (2013.01); *B60C 2011/0386* (2013.01); *B60C 2200/06* (2013.01)

(58) Field of Classification Search
CPC ..... B60C 11/04; B60C 11/042; B60C 11/047; B60C 11/125; B60C 2011/0346; B60C 2011/0348; B60C 2011/0355; B60C 2011/0386; B60C 2200/06; B60C 5/00; B60C 11/12; B60C 11/06; B60C 11/01

USPC ............... 152/209.25, 209.14, 209.27
See application file for complete search history.

(56) References Cited

U.S. PATENT DOCUMENTS 3,799,230 A *  3/1974  Montagne ................ B60C 9/26  
                                                 152/209.5  
6,116,309 A *  9/2000  Gillard ................ B60C 11/0083  
                                               152/209.14

(Continued)

FOREIGN PATENT DOCUMENTS

| JP | 2003-2014 A | 1/2003 |
|---|---|---|
| JP | 2012-153157 A | 8/2012 |

(Continued)

OTHER PUBLICATIONS

WO2014038377A1—Machine Translation (Year: 2014).*

(Continued)

*Primary Examiner* — Matthew J Daniels  
*Assistant Examiner* — Yunju Kim  
(74) *Attorney, Agent, or Firm* — Westerman, Hattori, Daniels & Adrian, LLP

(57) ABSTRACT

In a pneumatic tire including a plurality of main grooves extending in a tire circumference direction and ribs interposed between the two main grooves out of the plurality of main grooves, the ribs include a narrow groove including first narrow groove portions extending in one direction and second narrow groove portions extending in a direction different from the one direction and being arranged alternately in a zigzag pattern, the first narrow groove portions each include a bent portion and a narrow groove bottom sipe at a groove bottom of a portion including the bent portion.

6 Claims, 5 Drawing Sheets

(56) References Cited

U.S. PATENT DOCUMENTS

2014/0224397 A1 8/2014 Okabe
2015/0343848 A1* 12/2015 Washizuka ................ B60C 5/00
152/209.18

FOREIGN PATENT DOCUMENTS

| JP | 2012153157 A * | 8/2012 | ......... B60C 11/0306 |
| JP | 2013-71555 A | 4/2013 | |
| WO | WO-2014038377 A1 * | 3/2014 | ......... B60C 11/0306 |

OTHER PUBLICATIONS

Office Action dated Feb. 8, 2019, issued in counterpart Japanese Application No. 2015-124065, with partial English translation. (8 pages).

* cited by examiner

PNEUMATIC TIRE

CROSS REFERENCE TO RELATED APPLICATION

This application is based upon and claims the benefit of priority of Japanese Patent Application No. 2015-124065 (applied Jun. 19, 2015), the entire contents of which are incorporated herein by reference.

BACKGROUND OF THE INVENTION

1. Field of the Invention

The present invention relates to a pneumatic tire.

2. Related Art

There is a tire including a plurality of main grooves extending in a tire circumference direction on a tread, and a narrow groove extending in the tire circumference direction in a zigzag pattern on a rib interposed between the two main grooves (For example, see JP-A-2013-71555). The narrow groove described above has an effect of securing side-skid-resistance properties.

There is also a tire including sipes on both sides of a rib in a tire width direction (for example, see JP-A-2003-2014). The above-described rib provided with the sipes formed thereon has good road-hugging properties, and this uneven-wear-resistance properties of the tire are ensured.

However, even though the narrow groove having a zigzag pattern is formed, advanced wear of the tread may pose a risk of impeding maintenance of the side-skid-resistance properties. When the sipes are formed on both sides of the rib in the tire width direction, the uneven-wear-resistance properties of the tire are ensured to some extent. However, further improvement of the uneven-wear-resistance properties is desired. If the wear of the tread becomes advanced, the sipes may become less effective for ensuring the uneven-wear-resistance properties.

SUMMARY

Accordingly, it is an object of the invention to provide a pneumatic tire having excellent side-skid-resistance properties and uneven-wear-resistance properties and configured to be capable of ensuring the side-skid-resistance properties and the uneven-wear-resistance properties even though wear has become advanced.

A pneumatic tire of an embodiment includes a plurality of main grooves extending in a tire circumference direction and a rib interposed between the two main grooves out of the plurality of main grooves, in which the rib includes first narrow groove portions extending in one direction and second narrow groove portions extending in a direction different from the one direction and being arranged alternately in the zigzag pattern, and the first narrow groove portions each include a bent portion and a narrow groove bottom sips at a groove bottom of a portion including the bent portion.

The pneumatic tire of the embodiment has excellent side-skid-resistance properties and uneven-wear-resistance properties and configured in such a manner that the side-skid-resistance properties and the uneven-wear-resistance properties are ensured even though wear has become advanced.

DETAILED DESCRIPTION OF THE INVENTION

Figure 1:
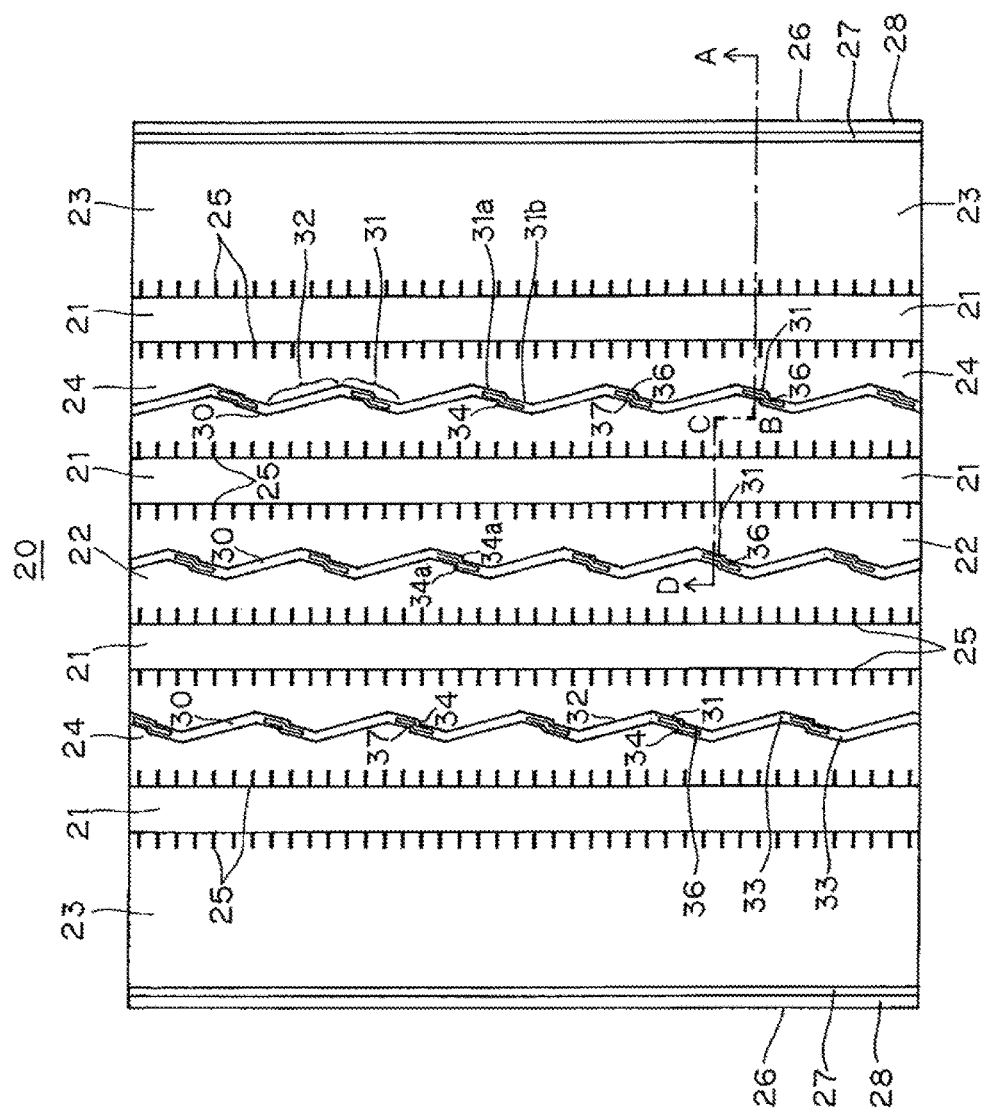
FIG. 1 is a drawing illustrating a tread pattern of a pneumatic tire of an embodiment.
Figure 2:
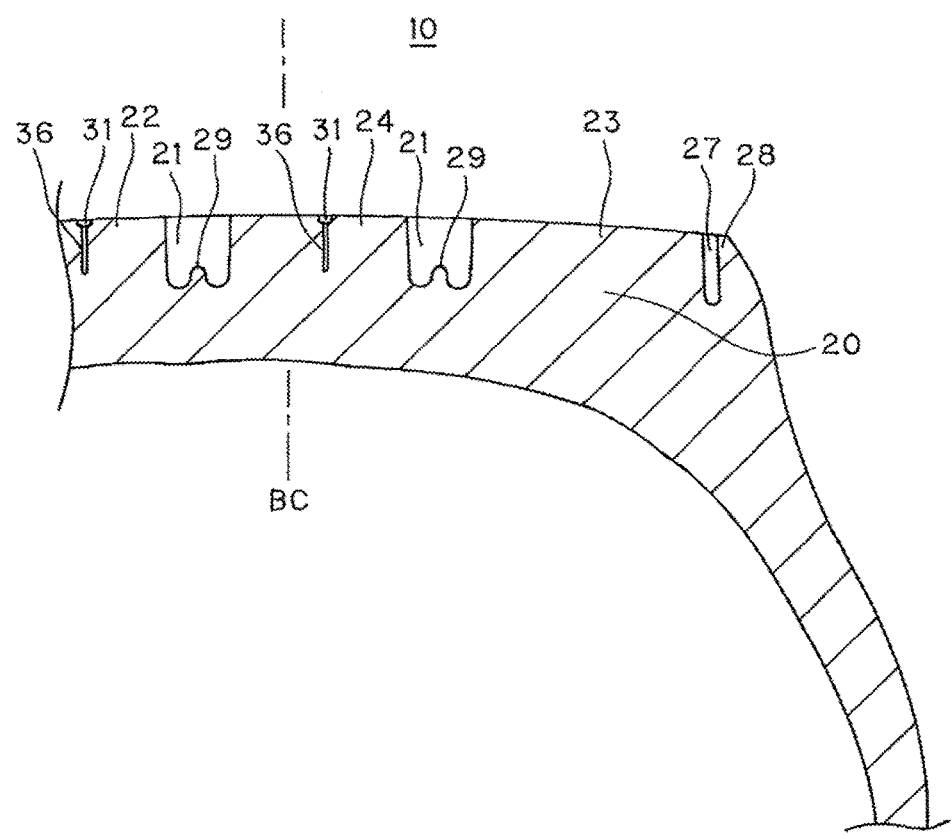
FIG. 2 is a cross-sectional view taken along A-B-C-D line, in FIG. 1.

A pneumatic tire 10 of an embodiment illustrated in FIG. 1 and FIG. 2 is provided with bead portions on both sides in a tire width direction, and carcasses are folded back from inside to outside in the tire width direction to envelope the bead portions and forming a framework of the pneumatic tire 10. The carcass is provided with a belt layer and a belt reinforcing layer outside in the tire radius direction, and a tread 20 is provided on the outside in a tire radius direction. Side walls are provided on both sides of the carcass in the tire width direction. In addition to these members, a plurality of members depending on requirements in terms of functions of the tire are also provided.

As illustrated in FIG. 1, the tread 20 of the embodiment is provided, with four main grooves 21 extending in a tire circumference direction. In the embodiment, the main grooves 21 extend in a linear fashion. However, the main grooves 21 may have a zigzag pattern or a wavy pattern. Although a width of the main grooves 21 is not limited, the widths not smaller than 10 mm are applicable, for example. By the width of a groove is meant a length of the groove in a direction orthogonal to a direction of extension of the groove. In the embodiment, the tread 20 is divided into five land portions by the four main grooves 21. The land portion at a center in the tire width direction corresponds to a center rib 22, the land portions on both sides in the tire width direction correspond to shoulder land portions 23, and the land portions between the center rib 22 and the shoulder land portions 23 correspond to mediate ribs 24. The center rib 22 and the mediate ribs 24 extend in the time circumference direction without being segmentalized by lateral grooves. The shoulder land portions 23 in the embodiment extend in the tire circumference direction without being segmentalized by the lateral grooves, but may be segmentalized by the lateral grooves and formed into block rows.

The center rib 22 and the two mediate ribs 24 are each provided with a narrow groove 30 extending in the tire circumference direction in the zigzag pattern. The narrow groove 30 is formed around a full circle of the tire. The narrow groove 30 includes first narrow groove portions 31 extending in one direction (in the case of FIG. 1, a direction from lower left to upper right) and second narrow groove portions 32 extending in a direction different from the one direction (in the case of FIG. 1, a direction from lower right to upper left) formed and arranged alternately. The first narrow groove portions 31 and the second narrow groove portions 32 are inclined with respect to the tire circumference direction and the tire width direction. A length of the first narrow groove portions 31 is shorter than a length of the second narrow groove portions 32. The length of the first narrow groove portions 31 and the length of the second narrow groove portions 32 correspond to a direct distance from one end portion of the narrow groove portion to the other end portion of the same narrow groove portion. A width of the narrow groove 30 is not larger than half a width of the main grooves 21, and falls within a range from 2 mm to 5 mm if the width of the main grooves 21 is not smaller than 10 mm, for example. Intersections between the first narrow groove portions 31 and the second narrow groove portions 32 form corner portions 33 of the narrow groove 30 having the zigzag pattern.

The first narrow groove portions 31 include bent portions 34 which are bent when viewed from the outside in the tire radius direction. Each of the first narrow groove portions 31 is bent twice at the bent portion 34 so that a portion 31a on one side of the bent portion 34 and a portion 31b on the other side of the bent portion 34 of the first narrow groove portions 31 extend in parallel to each other. By the bent portion 34 is meant part of the first narrow groove portion 31 within a certain distance from each of two bent points 34a for example, the same distance as the distance between the two bent points 34a).

The first narrow groove portions 31 each include a narrow groove bottom ripe 36 at a groove bottom of a portion including the bent portion 34. The narrow groove bottom sipe 36 is a groove having a width narrower than the narrow groove 30, and depressed further inward in the tire radius direction from the groove bottom of the first narrow groove portion 31. The narrow groove bottom sipe 36 is formed at the groove bottom of a portion of the first narrow groove portion 31 including the bent portions 34, and thus includes a bent portion 37 configured to be bent so as to follow the bent portion 34. In the same manner as the bent portion 34, the bent portions 37 of the narrow groove bottom sipes 36 each include two bent points. The bent portion 34 and the narrow groove bottom sipe 36 are formed in each of the first narrow groove portions 31. Therefore, the bent portions 34 and the narrow groove bottom sipes 36 are arranged in one row equidistantly in the tire circumference direction.

In contrast, the second narrow groove portions 32 each extend straight without having the bent portion.

A depth of the narrow grooves 30 here preferably falls within a range from 5% to 30% of a depth of the main grooves 21. In addition, a depth of the narrow groove bottom sipes 36 preferably falls within a range from 50% to 90% of a depth obtained by subtracting the depth of the narrow groove 30 from the depth of the main grooves 21.

The narrow groove 30 may be formed at any position on each of the ribs in the width direction. However, in the embodiment, the narrow groove 30 is formed at a center of each of the ribs in the width direction. In other words, a center of an area where the narrow groove 30 having the zigzag pattern is formed matches a center of the rib in the tire width direction.

The structures of the narrow groove 30 and of the narrow groove bottom sipes 36 described above are common to the center rib 22 and the two mediate ribs 24. However, the corner portions 33 of the respective narrow grooves 30 having the zigzag pattern on the center rib 22 and the two mediate ribs 24 are shifted by a certain distance in the tire circumference direction. Therefore, the positions of the bent portions 34 and the narrow groove bottom sipes 36 are shifted by a certain distance in the tire circumference direction from one rib to another.

On both sides of the center rib 22 and the mediate ribs 24 in a width direction, a plurality of rib edge sipes 25 are arranged equidistantly in the tire circumference direction. The rib edge sipes 25 open to the main grooves 21, and extend inward of the ribs in the tire width direction. A length of the rib edge sipes 25 preferably falls within a range from 5% to 20% of the width of each of the ribs. A depth of the rib edge sipes 25 preferably falls within a range from 50% to 80% of the depth of the main grooves 21. The width of the rib edge sipes 25 is preferably the width narrow enough to close in a grounded state of the tire. The rib edge sipes 25 are preferably arranged at a density of 5 to 10 positions per one pitch of a tread pattern. By the one pitch of the tread pattern is meant a portion from an end portion of a first narrow groove portion 31 in the time circumferential direction on one side to an end portion of the adjacent first narrow groove portion 31 on the one side in the tire circumference direction.

By the grounded state is meant a state in which the pneumatic tire 10 is assembled to a proper rim, is set to a proper inner pressure, and is loaded by a proper load. By the proper rim is meant a standard rim specified by standards such as JATMA, TRA, ETRTO, and the like. By the proper load is meant a maximum load determined by the standard. By the proper inner pressure is meant an inner pressure corresponding to the maximum load.

Preferably, the shoulder land portions 23 are each provided with a shoulder narrow groove 27 extending straight in the tire circumference direction at a portion on the ground contact end 26 side. By the ground contact ends 26 here is meant ground contact ends in the ground contact state outside thereof in the tire width direction. A portion between the shoulder narrow groove 27 and the ground contact end 26 corresponds to a sacrifice rib 28. The sacrifice ribs 28 are configured to protect the land portions inside thereof in the tire width direction from uneven wear by being worn by themselves. Preferably the shoulder land portions 23 each include the rib edge sipes 25, which are the same as those in the center rib 22 and the mediate ribs 24, in the vicinity of the end portion on the main grooves 21 side.

As illustrated in FIG. 2, a small projection 29 configured to prevent stone catching is preferably provided on the groove bottom of each of the main grooves 21. A projecting height of small projections 29 from the groove bottom is lower than the depth of the main grooves 21. Preferably, a plurality of the small projections 29 are provided and arranged in the direction of extension of the main grooves 21.

The pneumatic tire 10 having the structure as described above is excellent in side-skid-resistance properties because the narrow grooves 30 having the zigzag pattern and extending in the tire circumference direction are formed on the ribs. Since the first narrow groove portions 31 of the narrow groove 30 are provided with the bent portions 34, the ribs provided with the narrow groove 30 have high rigidity and are restricted from being deformed. Therefore, the pneumatic tire 10 having the ribs is excellent in uneven-wear-resistance properties. In addition, since the first narrow groove portions 31 each include the narrow groove bottom sipes 36 at the groove bottom of a portion including the bent portion 34, the ground contact pressures of the ribs are equalized and uneven wear is restricted. Since the narrow groove bottom sipes 36 each having the bent portion 37 remain even though the wear of the tread 20 has become advanced, the side-skid-resistance properties and the uneven-wear-resistance properties are ensured even though wear has become advanced. In this manner, the pneumatic tire 10 has excellent side-skid-resistance properties and uneven-wear-resistance properties and configured in such a manner that the side-skid-resistance properties and the uneven-wear-resistance properties are ensured even though the wear has become advanced.

In the case where the depth of the narrow grooves 30 is large and in the case where the width of the narrow groves 30 is small, the narrow groove 30 are closed at time of being grounded. However, since the narrow grooves 30 are formed into the zigzag pattern, portions opposing each other with the narrow grooves 30 of the ribs interposed therebetween support each other in the tire circumference direction when the narrow grooves 30 are closed. Therefore, movements of the ribs in the tire circumference direction are restricted, and uneven-wear-resistance properties are ensured.

The short the length of the narrow groove portions where the bent portions are provided is, the more effective of the bent portions that restrict the movement of the ribs becomes, and the longer the narrow groove portions where the bent portions are provided is, the lesser the restriction effect becomes and the more the ribs are likely to move. In the embodiment described above, the bent portions 34 and 37 are provided in the first narrow groove portions 31, which are shorter than the second narrow groove portions 32, and thus are significantly effective for restricting the movements of the ribs. Therefore, the excellent uneven-wear-resistance properties are achieved.

In the embodiment described above, the narrow grooves 30 are formed on the center rib 22 and the mediate ribs 24, which are subjected to higher ground contact pressures among other land portions, and thus are significantly effective for ensuring the side-skid-resistance properties.

In the embodiment described above, since the rib edge sipes 25 are arranged on both sides of the center rib 22 and the mediate ribs 24 in the tire width direction, these ribs have good road-hugging properties. Therefore, the pneumatic tire 10 is less likely to slip with respect to a road surface, and the ribs are not likely to be subjected to uneven wear. If the length of the rib edge sipes 25 is not shorter than 5% of the width of each rib, the road-hugging properties of the rib are specifically improved, and the uneven-wear-resistance properties are ensured. If the length of the rib edge sipes 25 is not longer than 20% of the width of each rib, rigidity of the ribs is not significantly lowered, so that the uneven-wear-resistance properties are ensured. If the depth of the rib edge sipes 25 is not smaller than 50% of the depth of the main grooves 21, the rib edge sipes 25 remain even though wear has become advanced and still produce the effect thereof. If the depth of the rib edge sipes 25 is not larger than 80% of the depth of the main grooves 21, the rigidity of the ribs is not significantly lowered, so that the uneven-wear-resistance properties are ensured.

Even though the depth of the narrow groove 30 is not smaller than 5% of the depth of the main grooves 21, excellent side-skid-resistance properties and traction properties are achieved. If the depth of the narrow groove 30 is not larger than 30% of the depth of the main grooves 21, the rigidity of the ribs is ensured, and thus the uneven-wear-resistance properties are ensured. If the depth of the narrow groove bottom sipes 36 is not smaller than 50% of the depth obtained by subtracting the depth of the narrow groove 30 from the depth of the grooves 21, sufficient side-skid-resistance properties and uneven-wear-resistance properties are ensured even though wear has become advanced. If the depth of the yarrow groove bottom sipes 36 is not larger than 90% of the depth obtained by subtracting the depth of the narrow groove 30 from the depth of the main grooves 21, rigidity of the ribs is ensured and uneven-wear-resistance properties are ensured.

The embodiment described thus far may be modified, replaced, and omitted variously without departing from the gist of the invention.

For example, although the first narrow groove portions 31 having the bent portions 34 and the narrow groove bottom sipes 36 as in the embodiment described above are preferably shorter than the second narrow groove portions 32 which do not have the bent portions 34 and the narrow groove bottom sipes 36, a case where the first narrow groove portions having the bent portions 34 and the like and the second narrow groove portions which do not have the bent portions 34 and the like have the same length and a case where the second narrow groove portions which do not have the bent portions 34 and the like are shorter are also applicable.

A shape of the bent portions of the first narrow groove portions may be modified in various manner. The bent portion may be of a type having one bent point, or of a type having three or more bent points. However, as in the embodiment described above, the portions of the first narrow groove portion on both sides of the bent portion interposed therebetween preferably extend in parallel to each other, and specifically, the portions of the first narrow groove portion on both sides of the bent portion interposed therebetween preferably extend in parallel to each other by having the bent points at two positions. The bent portion may be formed into a curved shape.

The number of the main grooves is not limited to four as in the embodiment described above. Therefore, the number of the land portions is not limited to five as in the embodiment described above. The narrow groove having the zigzag pattern and having the bent portions and the narrow groove bottom sipes is only required to be formed in any one of the ribs interposed between the two main grooves.

Figure 3:
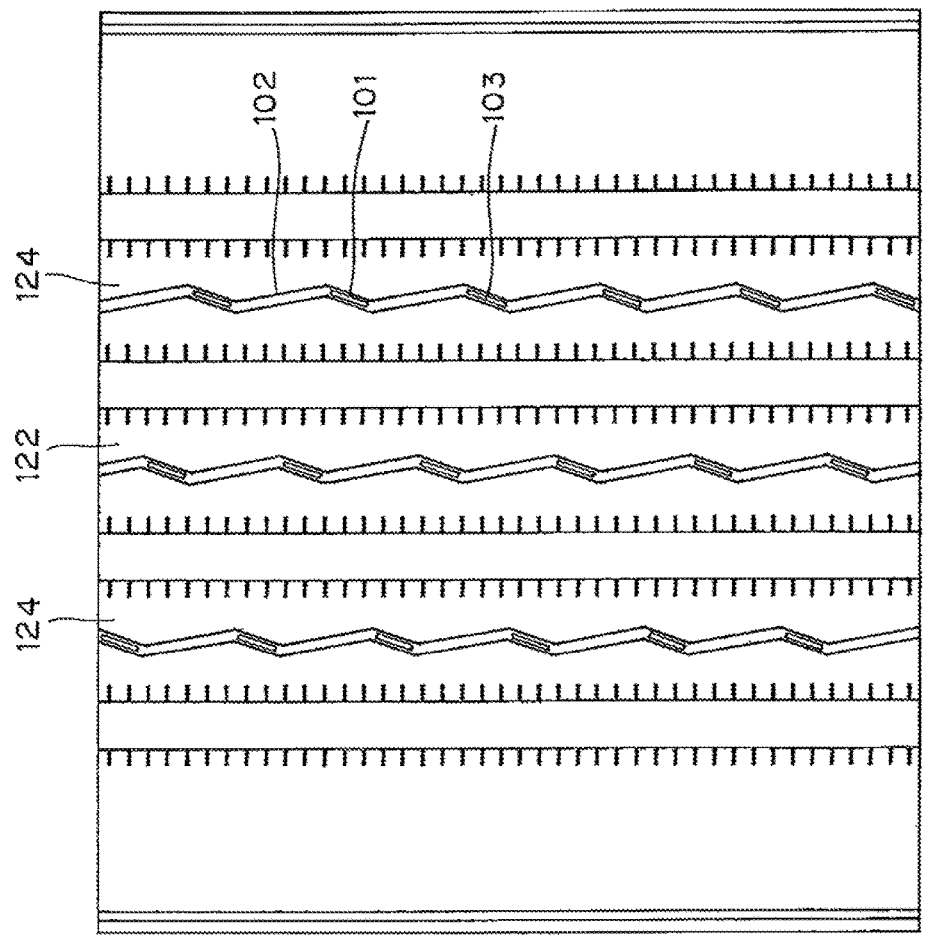
FIG. 3 is a tread pattern of a pneumatic tire of Comparative Example 1.
Figure 4:
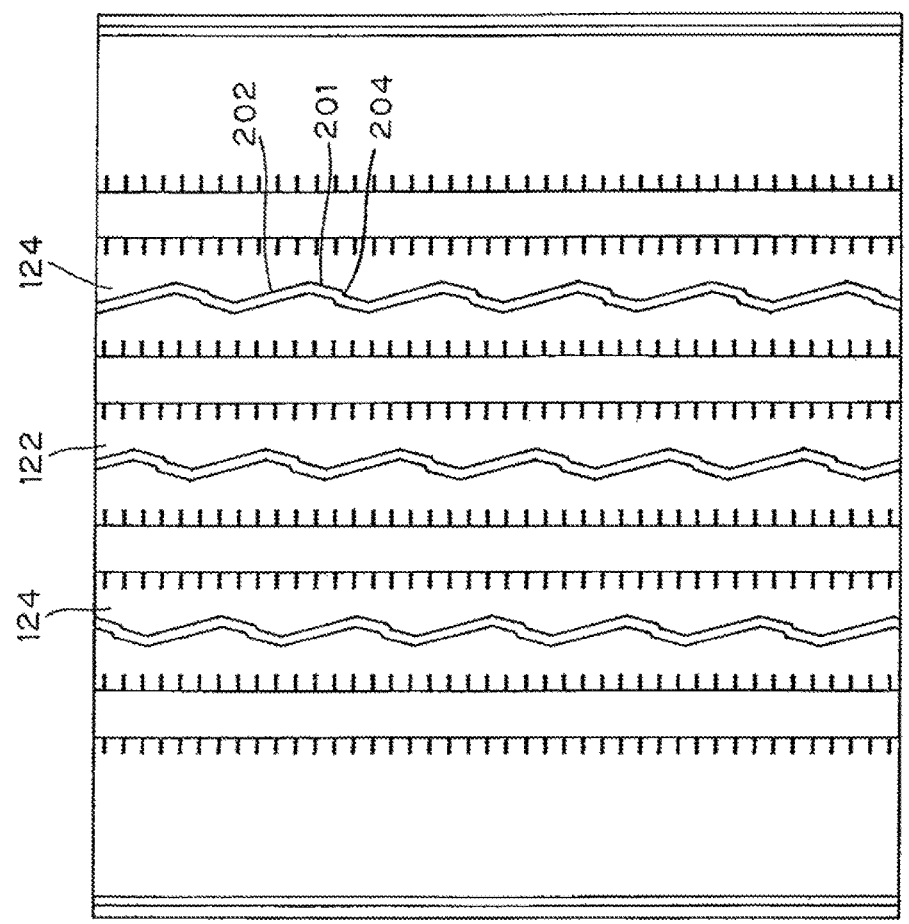
FIG. 4 is a tread pattern of a pneumatic tire of Comparative Example 2.
Figure 5:
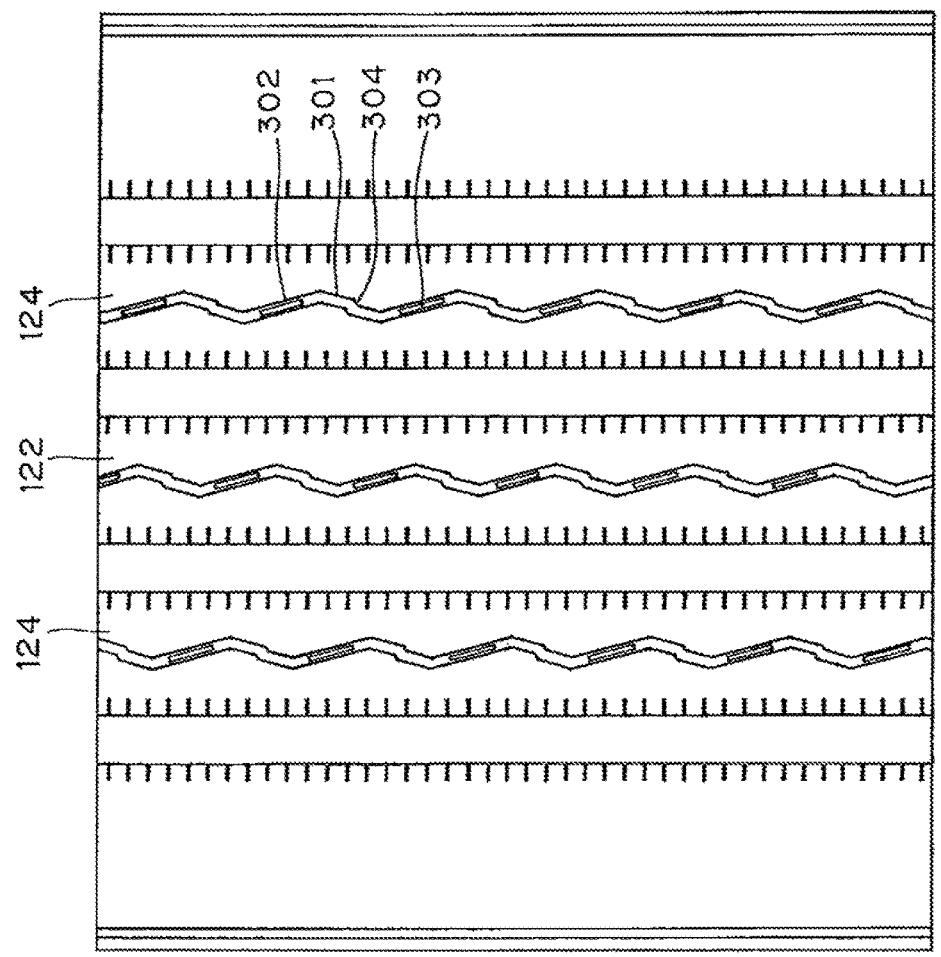
FIG. 5 is a tread pattern of a pneumatic tire of Comparative Example 3.

Evaluation on uneven-wear-resistance properties and side-skid-resistance properties of tires of the embodiment and comparative examples has been conducted. A tread of the tire of Example 1 corresponds to the tread of the embodiment described above. The tires in Comparative Examples 1 to 3 are provided with narrow grooves having the zigzag pattern and including short narrow groove portions and long narrow groove portions formed on a center rib 122 and mediate ribs 124. FIG. 3 illustrates a tread of the tire of Comparative Example 1. The tread is provided with bent portions neither in short narrow groove portions 101 nor in long narrow groove portions 102. The tread is provided with narrow groove bottom sipes 103 on groove bottoms of the short narrow groove portions 101. FIG. 4 illustrates a tread of a tire of Comparative Example 2. The tread is provided with bent portions 204 in short narrow groove portions 201. In this tread, the narrow groove bottom sipes are provided neither in the short narrow groove portions 201 nor in long narrow groove portions 202. FIG. 5 illustrates a tread of a tire of Comparative Example 3. The tread is provided with bent portions 304 in short narrow groove portions 301. In this tread, narrow groove bottom sipes 303 are provided in long narrow groove portions 302. The widths and the depths of main grooves, the narrow grooves having the zigzag pattern, and the narrow groove bottom sipes are as shown in Table 1, and are common to Example 1 and Comparative Examples 1 to 3. All of the tires have a size of 11R22.5.

TABLE 1

|  | Width | Depth |
|---|---|---|
| main groove | 13.0 mm | 11.6 mm |
| narrow groove | 2.7 mm | 1.0 mm |
| narrow groove bottom sipe (a depth is a depth from a groove bottom of a narrow groove) | 0.6 mm | 8.0 mm |

Evaluation has been conducted as follows. The tires described above were mounted on a rim having a size of 22.5×7.50, were set to an internal pressure of 700 kPa, and were mounted on a vehicle having a load capacity of 10 t, and then evaluation was conducted. All of indexes are relative indexes while letting a result of measurement of Comparative Example 1 be 100.

Uneven-wear-resistance properties: an uneven-worn state of the tread after travel of 20000 km (an amount of heel-and-toe wear and a difference between an amount of wear of the center land portion and an amount of wear of the shoulder land portions) was measured, and the result of measurement was indexed. The larger the index is, the lesser the uneven wear occurs, and hence the more excellent the uneven-wear-resistance properties became.

Side-skid-resistance properties: a lock braking was applied at the same time as entry of a vehicle on a road surface at a water depth of 1 mm at 40 km/h, a posture angle of the vehicle with respect to a direction of entry of the vehicle when the vehicle has been completely stopped was measured, and the result of measurement was indexed. Measurement and indexation was performed both for a case where tires in a new state were mounted on the vehicle and a case where tires in a state of being worn by 50% were mounted. The larger the index is, the smaller the posture angle is, and hence the more excellent the side-skid-resistance properties became.

The result of evaluation is as illustrated in Table 2. Numerical values shown in Table 2 are indexes described above, respectively. The tires in Example 1 were confirmed to be excellent in uneven-wear-resistance properties and side-skid-resistance properties in a new state and in a state of being worn by 50% compared with the tires in Comparative Examples 1 to 3.

TABLE 2

|  |  | Comparative Example 1 | Comparative Example 2 | Comparative Example 3 | Example 1 |
|---|---|---|---|---|---|
| Characteristics | Presence of bent portion in short narrow groove portion | No | Yes | Yes | Yes |
|  | Presence of narrow groove bottom sipe | Yes | No | Yes | Yes |
|  | Position of the narrow groove bottom sipe | Short narrow groove portion | — | long narrow groove portion | short narrow groove portion (first narrow groove portion) |
| Result | Uneven-wear-resistance properties | 100 | 103 | 97 | 111 |
|  | side-skid- resistance properties — New state | 100 | 103 | 102 | 103 |
|  | side-skid- resistance properties — State of being worn by 50% | 100 | 92 | 103 | 102 |

What is claimed is:

1. A pneumatic tire comprising:
a plurality of main grooves extending in a tire circumference direction and a plurality of ribs interposed between two main grooves out of the plurality of main grooves, wherein
each of the plurality of ribs includes a narrow groove having a zigzag pattern including first narrow groove portions extending in one direction and second narrow groove portions extending in a direction different from the one direction arranged alternately,
the first narrow groove portions each include a bent portion, and a narrow groove bottom sipe at a groove bottom of a portion including the bent portion,
the second narrow groove portions each extend straight and do not include a bent portion,
the second narrow groove portions do not include a narrow groove bottom sipe,
the plurality of ribs extend in the tire circumferential direction without being segmentalized by lateral grooves,
intersections between the first narrow groove portions and the second narrow groove portions form corner portions of the narrow groove having the zigzag pattern, and
the corner portions of the plurality of ribs are shifted by a certain distance in the tire circumference direction.

2. The pneumatic tire according to claim 1, wherein the first narrow groove portion is shorter than the second narrow groove portion.

3. The pneumatic tire according to claim 1, wherein
the main grooves form a center land portion located inside in a tire width direction, a shoulder land portion located outside in the tire width direction, and a mediate land portion located between the center land portion and the shoulder land portion, and the center land portion and the mediate land portion are the plurality of ribs including the narrow groove having the zigzag pattern.

4. The pneumatic tire according to claim 1, wherein a plurality of rib edge sipes opening into the main grooves are arranged on both sides of the plurality of ribs including the narrow groove having the zigzag pattern in the tire width direction.

5. The pneumatic tire according to claim 1, wherein a depth of the narrow groove having the zigzag pattern falls within a range from 5% to 30% of a depth of the main groove, and
a depth of the narrow groove bottom sipe falls within a range from 50% to 90% of a depth obtained by subtracting the depth of the narrow groove having the zigzag pattern from the depth of the main groove.

6. The pneumatic tire according to claim 1, wherein a shoulder land portion interposed between the main groove and a ground contact end is provided with a shoulder narrow groove extending straight in the tire circumference direction, and that a sacrifice rib is provided between the shoulder narrow groove and the ground contact end.

* * * * *